(12) United States Patent
Dziong et al.

(10) Patent No.: US 7,606,237 B2
(45) Date of Patent: Oct. 20, 2009

(54) SHARING RESTORATION PATH BANDWIDTH IN MESH NETWORKS

(75) Inventors: Zbigniew M. Dziong, Atlantic Highlands, NJ (US); Ramesh Nagarajan, Somerset, NJ (US); Muhammad A. Qureshi, Green Brook, NJ (US); Yung-Terng Wang, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 904 days.

(21) Appl. No.: 10/639,728

(22) Filed: Aug. 12, 2003

(65) Prior Publication Data

US 2004/0193724 A1    Sep. 30, 2004

Related U.S. Application Data

(60) Provisional application No. 60/459,163, filed on Mar. 31, 2003.

(51) Int. Cl.
*H04L 12/28* (2006.01)
(52) U.S. Cl. .......... 370/395.41; 370/242; 370/248; 370/250; 370/244
(58) Field of Classification Search .......... 370/228, 370/224, 223, 222, 241.1, 242, 248, 250, 370/244, 395.41; 714/4
See application file for complete search history.

(56) References Cited

U.S. PATENT DOCUMENTS

| | | | |
|---|---|---|---|
| 4,190,821 A | 2/1980 | Woodward | 714/4 |
| 4,594,709 A | 6/1986 | Yasue | 714/4 |
| 4,797,882 A | 1/1989 | Maxemchuk | 370/94 |
| 5,452,286 A | 9/1995 | Kitayama | 370/228 |
| 5,506,956 A | 4/1996 | Cohen | 395/182.04 |
| 5,706,276 A | 1/1998 | Arslan et al. | 370/216 |
| 5,754,543 A | 5/1998 | Seid | 370/351 |
| 5,854,903 A | 12/1998 | Morrison et al. | 395/200.79 |
| 5,856,981 A | 1/1999 | Voelker | 371/20.1 |
| 5,881,048 A | 3/1999 | Croslin | 370/228 |
| 5,933,422 A | 8/1999 | Kusano et al. | 370/331 |
| 5,933,425 A | 8/1999 | Iwata | 370/351 |
| 5,956,339 A | 9/1999 | Harada et al. | 370/400 |
| 5,995,485 A | 11/1999 | Croslin | 370/216 |
| 6,075,766 A | 6/2000 | Croslin | 370/225 |
| 6,104,701 A | 8/2000 | Avargues et al. | 370/238 |

(Continued)

OTHER PUBLICATIONS

ITU-T;"Operation & Maintenance mechanism for MPLS networks"; 2002; ITU-T pp. 1-22.*

(Continued)

*Primary Examiner*—Ricky Ngo
*Assistant Examiner*—Dewanda Samuel (57) ABSTRACT

A shared mesh data network (SMDN) for path-based recovery at the packet level. In one implementation, a first link in the network is part of two or more different protection paths, where each protection path corresponds to a different primary path. A network manager determines how much protection bandwidth to reserve on the first link for the two or more protection paths in such a way that the protection bandwidth reserved on the first link is shared between the protection paths of the two or more primary paths. As such, the amount of protection bandwidth reserved on the first link can be less than the sum of the bandwidths of the two or more primary paths. The SMDN provides efficient sharing of protection capacity. Implementations of the SMDN are appropriate to multiprotocol label-switched (MPLS) optical networks.

34 Claims, 6 Drawing Sheets

U.S. PATENT DOCUMENTS

| | | | | |
|---|---|---|---|---|
| 6,130,875 | A | 10/2000 | Doshi et al. | 370/225 |
| 6,141,319 | A | 10/2000 | Dighe et al. | 370/218 |
| 6,205,117 | B1 | 3/2001 | Doshi et al. | 370/228 |
| 6,282,170 | B1 | 8/2001 | Bentall et al. | 370/225 |
| 6,477,582 | B1 | 11/2002 | Luo et al. | 709/241 |
| 6,512,740 | B1 | 1/2003 | Baniewicz et al. | 370/216 |
| 6,538,987 | B1* | 3/2003 | Cedrone et al. | 370/216 |
| 6,549,513 | B1 | 4/2003 | Chao et al. | 370/227 |
| 6,606,303 | B1 | 8/2003 | Hassel et al. | 370/238 |
| 6,643,464 | B1 | 11/2003 | Roorda et al. | 398/59 |
| 6,697,334 | B1 | 2/2004 | Klincewicz et al. | 370/238 |
| 6,711,125 | B1 | 3/2004 | Walrand et al. | 370/223 |
| 6,725,401 | B1* | 4/2004 | Lindhorst-Ko | 714/47 |
| 6,744,727 | B2 | 6/2004 | Liu et al. | 370/228 |
| 6,760,302 | B1 | 7/2004 | Ellinas et al. | 370/228 |
| 6,778,492 | B2 | 8/2004 | Charny et al. | 370/228 |
| 6,795,394 | B1* | 9/2004 | Swinkels et al. | 370/222 |
| 6,807,653 | B2 | 10/2004 | Saito | 716/2 |
| 6,850,487 | B2 | 2/2005 | Mukherjee et al. | 370/225 |
| 6,856,592 | B2 | 2/2005 | Grover et al. | 370/216 |
| 6,863,363 | B2 | 3/2005 | Yabuta | 347/19 |
| 6,882,627 | B2 | 4/2005 | Pieda et al. | 370/248 |
| 6,904,462 | B1 | 6/2005 | Sinha | 709/226 |
| 6,977,889 | B1 | 12/2005 | Kawaguchi et al. | 370/228 |
| 6,982,951 | B2 | 1/2006 | Doverspike et al. | 370/217 |
| 6,996,065 | B2 | 2/2006 | Kodialam et al. | 370/238 |
| 7,039,009 | B2 | 5/2006 | Chaudhuri et al. | 370/225 |
| 7,042,836 | B2 | 5/2006 | Isonuma et al. | 370/224 |
| 7,099,286 | B1 | 8/2006 | Swallow | 370/255 |
| 7,110,356 | B2* | 9/2006 | Illikkal et al. | 370/222 |
| 7,133,358 | B2 | 11/2006 | Kano | 370/221 |
| 7,164,652 | B2* | 1/2007 | Puppa et al. | 370/225 |
| 7,180,852 | B1 | 2/2007 | Doverspike et al. | 370/217 |
| 7,188,280 | B2* | 3/2007 | Shinomiya et al. | 714/43 |
| 7,197,008 | B1* | 3/2007 | Shabtay et al. | 370/218 |
| 7,209,975 | B1 | 4/2007 | Zang et al. | 709/238 |
| 7,218,851 | B1 | 5/2007 | Zang | 398/33 |
| 7,248,561 | B2 | 7/2007 | Ishibashi et al. | 370/228 |
| 7,272,116 | B1 | 9/2007 | Houchen | 370/258 |
| 7,280,755 | B2 | 10/2007 | Kang et al. | 398/7 |
| 7,308,198 | B1* | 12/2007 | Chudak et al. | 398/58 |
| 7,362,709 | B1 | 4/2008 | Hui et al. | 370/237 |
| 7,398,321 | B2 | 7/2008 | Qiao et al. | 709/239 |
| 7,477,657 | B1 | 1/2009 | Murphy et al. | 370/468 |
| 2001/0038471 | A1 | 11/2001 | Agrawal et al. | 359/110 |
| 2002/0004843 | A1 | 1/2002 | Andersson et al. | 709/238 |
| 2002/0059432 | A1 | 5/2002 | Masuda et al. | 709/227 |
| 2002/0067693 | A1* | 6/2002 | Kodialam et al. | 370/216 |
| 2002/0071392 | A1 | 6/2002 | Grover et al. | 370/110 |
| 2002/0097671 | A1 | 7/2002 | Doverspike et al. | 370/216 |
| 2002/0118636 | A1* | 8/2002 | Phelps et al. | 370/222 |
| 2002/0141334 | A1* | 10/2002 | Deboer et al. | 370/227 |
| 2002/0174207 | A1 | 11/2002 | Battou | 709/223 |
| 2002/0191247 | A1 | 12/2002 | Lu et al. | 359/124 |
| 2002/0194339 | A1* | 12/2002 | Lin et al. | 709/226 |
| 2003/0005165 | A1 | 1/2003 | Langridge et al. | 709/251 |
| 2003/0009582 | A1 | 1/2003 | Qiao et al. | 709/233 |
| 2003/0018812 | A1* | 1/2003 | Lakshminarayana et al. | 709/241 |
| 2003/0021222 | A1 | 1/2003 | Boer et al. | 370/110 |
| 2003/0037276 | A1 | 2/2003 | Mo et al. | 714/4 |
| 2003/0048749 | A1 | 3/2003 | Stamatelakis et al. | 370/225 |
| 2003/0065811 | A1 | 4/2003 | Lin et al. | 709/232 |
| 2003/0095500 | A1 | 5/2003 | Cao | 370/216 |
| 2003/0112760 | A1* | 6/2003 | Puppa et al. | 370/241.1 |
| 2003/0117950 | A1 | 6/2003 | Huang | 370/220 |
| 2003/0147352 | A1 | 8/2003 | Ishibashi et al. | 370/248 |
| 2003/0169692 | A1 | 9/2003 | Stern et al. | 370/242 |
| 2003/0179700 | A1 | 9/2003 | Saleh et al. | 370/216 |
| 2003/0193944 | A1* | 10/2003 | Sasagawa | 370/389 |
| 2003/0223357 | A1* | 12/2003 | Lee | 370/218 |
| 2004/0004938 | A1 | 1/2004 | Buddhikot et al. | 370/238 |
| 2004/0008619 | A1 | 1/2004 | Doshi et al. | 370/217 |
| 2004/0042402 | A1* | 3/2004 | Galand et al. | 370/237 |
| 2004/0052207 | A1* | 3/2004 | Charny et al. | 370/216 |
| 2004/0057375 | A1* | 3/2004 | Shiragaki et al. | 370/216 |
| 2004/0114512 | A1* | 6/2004 | Johri | 370/225 |
| 2004/0165526 | A1* | 8/2004 | Yada et al. | 370/228 |
| 2004/0174882 | A1* | 9/2004 | Willis | 370/395.5 |
| 2004/0184402 | A1 | 9/2004 | Alicherry et al. | 370/216 |
| 2004/0190445 | A1 | 9/2004 | Dziong et al. | 370/225 |
| 2004/0190461 | A1* | 9/2004 | Gullicksen et al. | 370/258 |
| 2004/0205239 | A1 | 10/2004 | Doshi et al. | 709/241 |
| 2004/0208547 | A1* | 10/2004 | Sabat et al. | 398/50 |
| 2004/0233843 | A1 | 11/2004 | Barker | 370/225 |
| 2005/0185652 | A1* | 8/2005 | Iwamoto | 370/395.1 |
| 2005/0201276 | A1* | 9/2005 | Sinha | 370/225 |
| 2005/0232144 | A1* | 10/2005 | Doverspike et al. | 370/216 |
| 2006/0013149 | A1* | 1/2006 | Jahn et al. | 370/254 |
| 2006/0051090 | A1 | 3/2006 | Saniee et al. | 398/59 |
| 2006/0178918 | A1* | 8/2006 | Mikurak | 705/7 |
| 2007/0011284 | A1 | 1/2007 | Le Roux et al. | 709/223 |
| 2008/0095045 | A1* | 4/2008 | Owens et al. | 370/220 |

OTHER PUBLICATIONS

"Optical Network Design and Restoration" by B. T. Doshi, et al., BLTJ, Jan.-Mar. 1999.

"Design of a Meta-mesh of Chain Subnetworks: Enhancing the Attractiveness of Mesh-Restorable WDM networking on Low Connectivity Graphs" by W. D. Grover and J. Doucette, IEEE JSAC, vol. 20, No. 1, Jan. 2002.

"Sonet Bidirectional Line-Switched Ring Equipment Generic Criteria," Generic Requirements, GR-1230-Core, Issue 4, Dec. 1998, pp. 3-48 through 3-61.

"RSVP-TE: Extensions to RSVP for LSP Tunnels" by D. Awduche, L. Berger, D. Gan, T. Li, V. Srinivasan, and G. Swallow; Cisco Systems, Inc. Dec. 2001, pp. 1-55.

"Operation & Maintenance mechanism for MPLS networks"; ITU-T Recommendation Y.1711; Telecommunication Standardization Sector of ITU; Series Y: Global Information Infrastructure And Internet Protocol Aspects; Nov. 2002.

Cisco's Packet over Sonet/SDH (POS) Technology Support; Mission Accomplished Copyright 1997. Cisco Systems, Inc. pp. 1-8.

"Fast, Scalable, and Distributed Restoration in General Mesh Optical Networks" by Gary P. Austin et al.; Bell Labs Technical Journal; Jan.-Jun. 2001; pp. 67-81.

"Optimal Design and Evaluation of Survivable WDM Transport Networks" by Yasuhiro Miyao et al.; IEEE Journal on Selected Areas in Communications, vol. 16, No. 7, Sep. 1998, pp. 1190-1198.

"Using Local Information for WDM Network Protection", by Hungjen Wang et al., http://www.mit.edu/~modiano/papers/C46.pdf, 2002, pp. 1-4.

* cited by examiner

FIG. 1

TABLE 1

| Link | L1 | L2 | L3 | L4 | L5 | L6 | L7 | N1 | N2 | N3 | N4 | N5 | N6 | Max |
|------|----|----|----|----|----|----|----|----|----|----|----|----|----|-----|
| L1 |  |  | 1 | 1 |  | 1 |  |  |  |  |  | 1 |  | 1 |
| L2 |  |  | 1 | 1 |  | 1 |  |  |  |  |  | 1 |  | 1 |
| L3 | 1 | 1 |  | 1 |  |  |  | 1 |  |  |  |  |  | 1 |
| L4 | 1 | 1 | 1 |  | 1 |  | 1 | 1 |  |  |  |  |  | 1 |
| L5 |  |  | 1 |  |  | 1 |  |  |  | 1 |  | 1 |  | 1 |
| L6 |  |  |  | 1 | 2 |  | 1 |  | 1 | 1 |  |  |  | 2 |
| L7 |  |  | 1 | 1 | 1 | 1 |  |  | 1 |  |  | 1 |  | 1 |

FIG. 2

TABLE 2

| Link | L1 | L2 | L3 | L4 | L5 | L6 | L7 | N1 | N2 | N3 | N4 | N5 | N6 | Max |
|---|---|---|---|---|---|---|---|---|---|---|---|---|---|---|
| L1 | 1 |  | 2 | 2 |  | 1 |  |  |  |  |  | 2 |  | 2 |
| L2 | 1 | 1 | 2 | 2 |  | 1 |  |  |  |  |  | 2 |  | 2 |
| L3 |  | 1 |  | 1 |  |  |  |  |  |  |  |  |  | 1 |
| L4 |  |  | 1 |  | 1 |  | 1 | 1 |  |  |  |  |  | 1 |
| L5 |  |  |  | 1 | 2 | 1 |  |  | 1 | 1 |  | 1 |  | 1 |
| L6 |  |  | 1 | 1 | 1 | 1 | 1 | 1 | 1 | 1 |  |  |  | 2 |
| L7 |  |  | 1 | 1 |  |  |  |  |  |  |  | 1 |  | 1 |

SHARING RESTORATION PATH BANDWIDTH IN MESH NETWORKS

CROSS-REFERENCE TO RELATED APPLICATIONS

This application claims the benefit of the filing date of U.S. provisional application No. 60/459,163, filed on Mar. 31, 2003.

BACKGROUND OF THE INVENTION

1. Field of the Invention

The present invention relates to network communications and, more specifically, to protection path sharing.

2. Description of the Related Art

Advances in wavelength-division multiplexing (WDM) related technologies have started to allow for routing and networking at the optical layer of communications networks, providing a migration toward true optical-layer networking. Optical-layer networking associated with mesh-connected optical networks creates the need for routing wavelength demands over the mesh optical networks and an equivalent need for service recovery in the optical domain in the event of failures.

Traditionally, fast recovery services have been considered an integral part of a transport network, while data networks (e.g., Internet Protocol (IP) networks) were primarily targeted to achieve "best-effort" services. However, with the increasing use of data networks to carry time-critical data (e.g., voice-over-IP (VoIP) data), resiliency and fast recovery of service is becoming an important feature of data networks as well.

With the explosion of IP traffic, traffic engineering of IP flows has become important. To address traffic engineering, label-based switching techniques have been specified that allow an ingress node to route "beneath" the IP routing mechanism. These techniques effectively allow tunneling of IP traffic between ingress and egress nodes in a network transparent to the IP routing protocols and allow for traffic engineering and the bypassing of failed or congested links. One such technique, known as multiprotocol label switching (MPLS), is defined in Rosen, E., Viswanathan, A., and Callon, R., "Multiprotocol Label Switching Architecture," RFC 3031, January 2001 (herein "RFC 3031"), incorporated herein by reference in its entirety. An alternative such technique, known as IP-over-ATM is discussed in ATM Forum Specification, Multi-Protocol over ATM v1.0, July 1997 (herein "MPOA"), also incorporated herein by reference in its entirety.

While MPLS and related protocols provide a mechanism for directing or engineering traffic in data networks, the issues of use of such protocols for efficient recovery management in data networks continue to present a challenge to network operators.

SUMMARY OF THE INVENTION

Problems in the prior art are addressed in accordance with principles of the invention by a technique in which protection bandwidth in a mesh data network is shared between the protection paths of two or more protection paths in the network. As such, the amount of protection bandwidth reserved on the shared link can be less than the sum of the bandwidths of the two or more corresponding primary paths. Such a network is referred to in this specification as a shared mesh data network (SMDN).

In one possible optical implementation, a shared mesh data network includes (a) two or more nodes, (b) two or more optical links interconnecting the nodes, and (c) a network manager (either centralized or distributed) adapted to control reservation of protection bandwidth for the links. In this embodiment, a first link in the network is part of two or more different protection paths, where each protection path corresponds to a different primary path. The network manager determines how much protection bandwidth to reserve on the first link for the two or more protection paths in such a way that the protection bandwidth reserved on the first link is shared between the protection paths of the two or more primary paths.

Certain embodiments of the present invention incorporate path-based recovery at the packet level to provide efficient sharing of protection capacity, while putting few requirements on intermediate network elements. Networks of the present invention preferably include mechanisms for fast detection, fast failure notification, signaling to enable protection and bandwidth sharing, and identification of locally cached vs. transmitted sharing information. Although not limited to optical applications, the present invention can be implemented in communication networks that transmit signals between nodes using optical transmission technology.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Introduction

Significant research has been done into various restoration and protection strategies for mesh networks at both the service and optical layers. Proposed architectures include centralized vs. distributed, precomputed vs. computed on demand in real-time, and link-based vs. path-based. Characteristics that distinguish between these various restoration and protection strategies include recovery time, failure coverage, and required recovery capacity. A survey of relevant research as well as a specific distributed recovery strategy that provides sub-second recovery times for carrier-scale mesh-based optical networks is addressed in Doshi, B. T., Dravida, S., Harshavardhana, P., Hauser, O., and Wang, Y., "Optical Network Design and Restoration," Bell Labs Technical Journal, January-March 1999 (herein "Doshi 99"), incorporated herein by reference in its entirety.

So-called "shared mesh recovery" is a known concept in optical transport networks (e.g., SONET/SDH). In this scheme, when a failure occurs, the network recovers service carried by the affected paths by using recovery capacity that has been set aside on alternative routes for this purpose. The recovery capacity can be shared over multiple failure scenarios. This involves commensurate switching capability from the transport network elements (e.g., digital cross connects).

Though the term "restoration" in the art is sometimes used synonymously with "protection," in this document, restoration is considered to be the process of recovering service by computing alternative paths and taking various associated recovery actions following the detection of a failure. Meanwhile, protection is considered to be the process of switching automatically to a precomputed protection path. Protection generally exhibits shorter recovery times but may be less optimal than restoration, the latter of which benefits from the ability to assess the most current state of the network demands and resources.

The Shared Mesh Data Network

Figure 1:
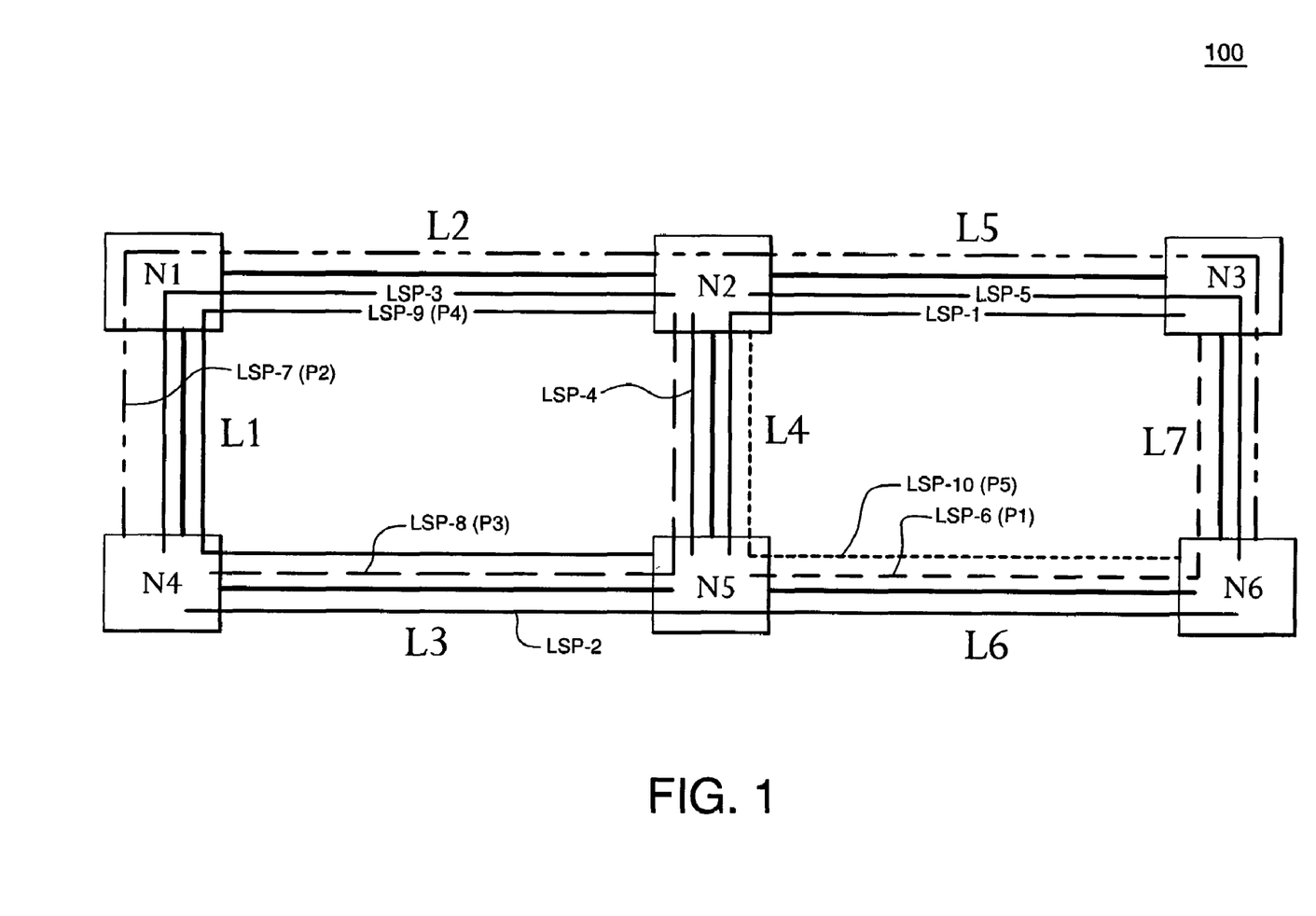
FIG. 1 illustrates an exemplary shared mesh data network (SMDN) according to one embodiment of this invention.

FIG. 1 illustrates an exemplary shared mesh data network (SMDN) 100 according to one embodiment of this invention. A mesh network is a network topology in which there are at least two nodes with two or more paths between them. A data network is a network in which data is communicated asynchronously between nodes in packetized form. As shown, SMDN 100 includes six ingress/egress nodes N1 to N6 interconnected by seven bidirectional links L1 to L7.

In this example, the data network supports the multiprotocol label switching (MPLS) architecture standard per RFC3031; however, as would be understood by one skilled in the art, other data technologies that offer similar data traffic engineering features (e.g., ATM and frame relay) could be substituted for MPLS.

As illustrated, SMDN 100 has been provisioned with five primary label-switched paths (LSPS) LSP-1 to LSP-5. A label-switched path is effectively a tunnel between two nodes that carries service traffic according to a predetermined route. For example, LSP-1 is a tunnel between N3 and N5 that follows the path N3-N2-N5. LSP-1 could alternatively be described by the links it traverses, i.e., L5-L4, or by the nodes and links, i.e., N3-L5-N2-L4-N5; however, for this discussion, in cases where no ambiguity will arise from the node-only-based notation, that notation will be used.

An LSP is typically considered to be unidirectional; however, for clarity of illustration, one bidirectional path is associated with each LSP in FIG. 1. Further, each LSP may have an associated demand of any reasonable value (e.g., T1, OC-12, and OC-48); however, without loss of generality, each of the LSPs in FIG. 1 is assumed to be of unit demand. Extension to pairs of unidirectional LSPs and variable demands would be understood to one skilled in the art.

As illustrated, LSP-1 carries traffic along path N3-N2-N5, LSP-2 carries traffic along path N4-N5-N6, LSP-3 carries traffic along path N2-N1-N4, LSP-4 carries traffic along path N2-N5, and LSP-5 carries traffic along path N2-N3-N6.

Disjoint Primary and Protection Paths

FIG. 1 also illustrates five exemplary protection paths (also of unit bandwidth in this example) that have been reserved to use for protection of services given a failure of one of the primary paths. LSP-6 (along path N3-N6-N5) protects LSP-1, LSP-7 (along path N4-N1-N2-N3-N6) protects LSP-2, LSP-8 (along path N2-N5-N4) protects LSP-3, LSP-9 (along path N2-N1-N4-N5) protects LSP-4, and LSP-10 (along path N2-N5-N6) protects LSP-5. For clarity, in FIG. 1, the tag for each protection LSP carries a parenthetical suffix indicating the primary LSP it protects. For example, LSP-6 (P1) indicates the protection role that LSP-6 plays for primary LSP-1.

Note that the protection paths in the example of FIG. 1 are (strictly) disjoint from the primary paths that they protect. Disjoint in this context means that they share no common links or nodes other than the common ingress and egress nodes. Though the protection paths of this example are disjoint from the paths they protect, this need not be the case in all implementations of the present invention. There will be some cases in some variants of the invention where no alternative disjoint path exists between two nodes to serve as a protection path. In other cases, other factors or constraints of the routing algorithm may lead to selection of a protection path, for a given primary path, that is not disjoint from the primary path (e.g., the protection path may share some common links with the primary path). Thus, rather than being (strictly) disjoint, the primary paths of this invention are at least partially disjoint from their respective protection paths, where two partially disjoint paths have at least two links that are different. With this definition, (strictly) disjoint paths are a particular type of partially disjoint paths.

A number of different mechanisms exist in the art for calculation of disjoint paths between nodes given various topology and traffic information. This is not the primary focus of the present invention. Some exemplary algorithms are detailed in Doshi '99. Additionally, multiple mechanisms exist for establishing primary and protection LSPs once they are calculated, e.g., simple network management protocol (SNMP) per Network Working Group, "Introduction to a Simple Network Management Protocol (SNMP) version 3," RFC2570, April 1999 (herein "RFC2570") and RSVP-TE as covered by Awduche, D., Berger, L., Gan, D., et al., "RSVP-TE: Extensions to RSVP for LSP Tunnels," RFC 3209, December 2001 (herein "RFC 3209"), each of which is incorporated herein by reference in its entirety.

Link Capacity

In the embodiment of the invention illustrated by the example of FIG. 1, to provide for fall recovery of services given any one link failure, the capacity of a link must be large enough to accommodate the services that it supports as well as the services it protects. For example, L5 is one link in primary service paths LSP-1 and LSP-5. It is said to "support" both of those paths. Assuming that LSP-1 and LSP-5 each carry one unit of demand bandwidth, L5 will need at least two units of allocated capacity to support the two of them. L5 also supports the protection path (LSP-7) for service path LSP-2 (requiring an additional one unit of capacity). Thus, the capacity of L5 must be at least three units of bandwidth in this example, two units of allocated bandwidth and one unit of reserved bandwidth.

Reservation vs. Allocation

In one embodiment of the present invention, the bandwidth associated with the protection path (LSP-7) for service path LSP-2 is not allocated in advance of a failure, but is, instead, only reserved. If the bandwidth were allocated in advance of a failure, this would correspond, in the parlance of the field of protection and restoration for optical transport networks, to a 1:1 protection scheme. If the bandwidth were not only allocated, but additionally if a copy of the service path's data were to be duplicated to the protection path, this would correspond to a 1+1 protection scheme. However, in preferred embodiments of this invention, the protection bandwidth is not allocated until after the detection of a failure. Thus, in such implementations, this unallocated bandwidth might be used for "opportunistic" data, i.e., data that has a lower guaranteed quality of service (QoS) than the protected traffic. Further, because the protection bandwidth is reserved and not allocated, "sharing" can be supported, as defined below.

Sharing and Single Failure Coverage

Another characteristic of certain SMDNs of this invention is termed "sharing." This refers to the facility to share reserved protection capacity on a link between more than one LSP. As described previously, the primary paths provisioned on the SMDN are assumed to be partially disjoint from their respective protection paths. This means that, given a failure on a first link that supports a first primary path, there is at least one protection link (different than the first link) that has been designated to carry reserve capacity to protect the first primary path. Recovery from a failure along the primary path is achieved by switching the affected traffic at the ingress node from the failed primary path to the protection path. For a successful recovery, at the time of protection switching, enough capacity should be available on all links along the protection path. One way of achieving this is by allocating dedicated bandwidth along the protection path of each LSP. This will result in excessive use of protection bandwidth. A more efficient scheme involves sharing the protection capacity of a link between LSPs that are not generally affected by the same single node or link failure. For example, consider the protection capacity that is set aside on a link along the protection path to recover from a failure along a first primary path. Next assume that this link is also designated as part of the protection path of a second primary path that is disjoint from the first primary path (in this case, the second primary path would not be affected by a failure along the first primary path). Then, given the assumption that no more than one link will fail at a given point in time (a reasonable assumption given the mean-time-between-failure (MTBF) statistics of state-of-the-art networks), the two primary paths may "share" the reserved protection bandwidth of the protection link.

An example should help clarify the concept. Consider LSP-3 of SMDN 100 as the first primary path. It is protected by LSP-8, which includes L4 (a protection link for LSP-3). LA also serves as part of the protection path (LSP-10) of LSP-5, where LSP-5 does not share any links with LSP-3 (i.e., LSP-3 and LSP-5 are disjoint). Thus, only one unit of capacity needs to be reserved on L4 to protect against a failure affecting either LSP-3 or LSP-5. LSP-3 and LSP-5 are considered to "share" this protection capacity on L4. The general extension of this concept to the full SMDN is considered to be a generalized shared mesh technique according to this invention. Similarly, node failures represent another basis for protection bandwidth reservation, and similarly may benefit from the sharing aspect of this invention.

Worst-Case Link Protection Capacity

The amount of bandwidth reserved on a given link for protection purposes is chosen to accommodate the worst-case traffic demand that would be placed upon that link given the failure of any other one link or any one node in the network. As another example of sharing and to help clarify this concept, consider link L6 of SMDN 100. Link L6 supports both LSP-6 and LSP-10, the protection paths for LSP-1 and LSP-5, respectively. LSP-1 includes intermediate node N2 and links L4 and L5, while LSP-5 includes intermediate node N3 and links L5 and L7. Since N2 is a terminal node of LSP-5, service protection for LSP-5 is not available in the event of a failure of N2. As such, only one unit of reserve capacity on link L6 is needed to protect LSP-1 from a failure of N2. Similarly, since N3 is a terminal node of LSP-1, service protection for LSP-1 is not available in the event of a failure of N3. As such, only one unit of reserve capacity on link L6 is needed to protect LSP-5 from a failure of N3. A failure of link L4 would result in a failure of LSP-1, creating a need for one unit of reserve capacity on link L6. Similarly, a failure of link L7 would result in a failure of LSP-5, also creating a need for one unit of reserve capacity on link L6. Since L4 and L7 are independent links, a failure of only one or the other (but not both) is all that needs to be considered. Thus, the reserve capacity required on L6 could still be capped at one unit. However, if a failure on L5 is considered, both LSP-1 and LSP-5 are affected. Since this one failure could result in a concurrent demand of two, a "worst case" of two units of bandwidth would have to be reserved on L6 to ensure maximal recovery of the network under the assumption of a maximum of one link or node failure at time. In general, in the calculation of the reserve capacity required for each link of SMDN 100, the effect of the failure of each node and each of the other links in the network is independently considered and the worst-case capacity is reserved.

Tabulation

Figure 2:
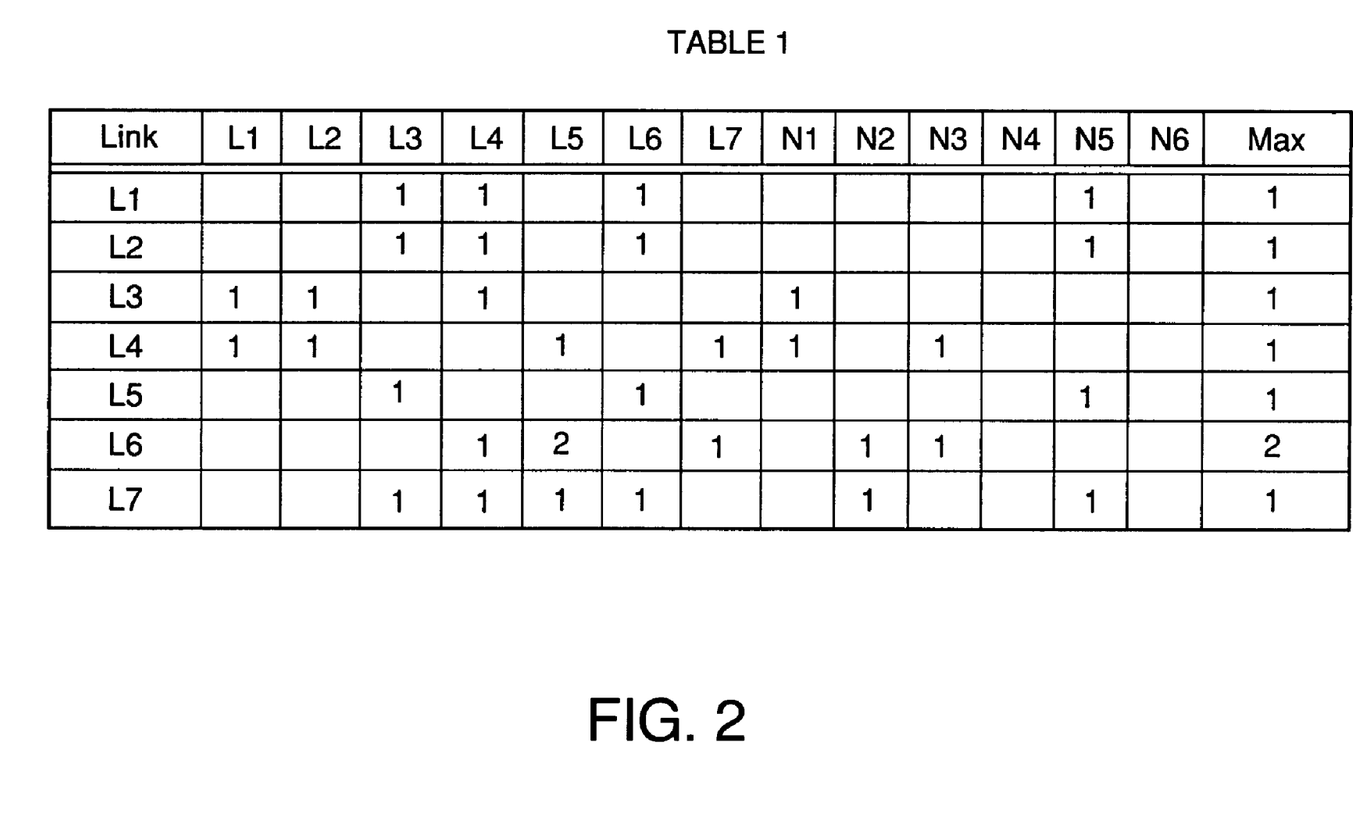
FIG. 2 illustrates TABLE 1, which captures an example of the minimal amount of protection capacity on each link for every possible single link or node failure in the SMDN 100 of FIG. 1.

The concepts of the previous sections are quantified by TABLE 1 of FIG. 2. TABLE 1 shows the minimal amount of protection capacity on each link for every possible single link or node failure in the SMDN. Each row of TABLE 1 corresponds to a link of SMDN 100. Each column entry of each row identifies the protection capacity to protect service in the event of a failure of the link or node associated with that column in the table. Using a table such as this one, realization of sharing the protection capacity among different failures can be achieved.

To better understand TABLE 1, consider the first row, which is associated with link L1. The entry of "1" in the column labeled L3 for the first row indicates that there is one unit of traffic on link L3 (due to LSP-2) that would employ link L1 on its recovery route if link L3 gets impacted by a failure. Similarly, the entry of "1" in column labeled N5 addresses the case of a failure of node N5 and its impact on link L1. The last column titled Max is the maximum value of all entries in that row. It is the amount of protection bandwidth that needs to be reserved on that link for the worst-case single failure in the network. This value for link L6, for example, is 2 units to cover the case of a failure of link L5 as discussed in the previous section (and as reflected by the entry of "2" in row L6, column L5 of TABLE 1. The other entries of TABLE 1 are determined similarly.

Completion of the information in TABLE 1 and the calculation of the Max value enable the determination of how much protection capacity to reserve on each link in the SMDN to realize full recovery of services in the SMDN in the event of a single link or node failure.

Distributed Versus Centralized Sharing Database

The information in TABLE 1 can be either maintained in a centralized fashion at a server or distributed to the nodes in the SMDN. In case of a centralized architecture, TABLE 1 might reside on a centralized server and be updated after the provisioning of each new primary and protection LSP. Signaling is used to notify nodes of any change in the reservation bandwidth on any of their connected links.

In a preferred distributed architecture embodiment of SMDN 100, portions of the information from TABLE 1 are distributed to nodes throughout the network. In one implementation, each node keeps track of only the amount of protection capacity on each of its incident links. For example, node N5 in SMDN 100 keeps track of only the protection capacity reserved on L3, L4, and L6. This corresponds to the information from TABLE 1 in the rows labeled with those link designations (i.e., L3, L4, and L6). Likewise, node N1 keeps track of information relevant to L1 and L2 (corresponding to the rows labeled L1 and L2 from TABLE 1). Note that N4 and N5 both keep track of information relevant to L3. A secondary mechanism (e.g., periodic refresh or localized flooding) is used to keep the (now distributed) information of TABLE 1 current and up-to-date.

Distribution of Sharing Data

In steady-state operation of an SMDN, it is assumed that once a new demand (i.e., service request) is received at a node, a route computation routine is invoked that calculates both a primary (sometimes known as "working") path as well as a protection path for the demand. Signaling (e.g., SNMP or RSVP-TE signaling as discussed earlier) is used to establish the primary LSP and to reserve bandwidth for the protection LSP. The signaling along the protection LSP carries the information of the primary LSP in terms of its demand bandwidth as well as nodes and links it contains. For each of the links incident to a node in the protection LSP, the node updates its local reserved bandwidth database (corresponding to its portion of the rows of TABLE 1). This update involves incrementing, by the requested demand bandwidth, the value in each entry of each relevant row that corresponds to a link or node in the primary path (i.e., those links or nodes that, upon failure, would cause a disruption in service of the primary LSP and thereby levy a bandwidth demand on the links in the corresponding protection LSP). The update also involves calculating the maximum value of each updated row.

Figure 3:
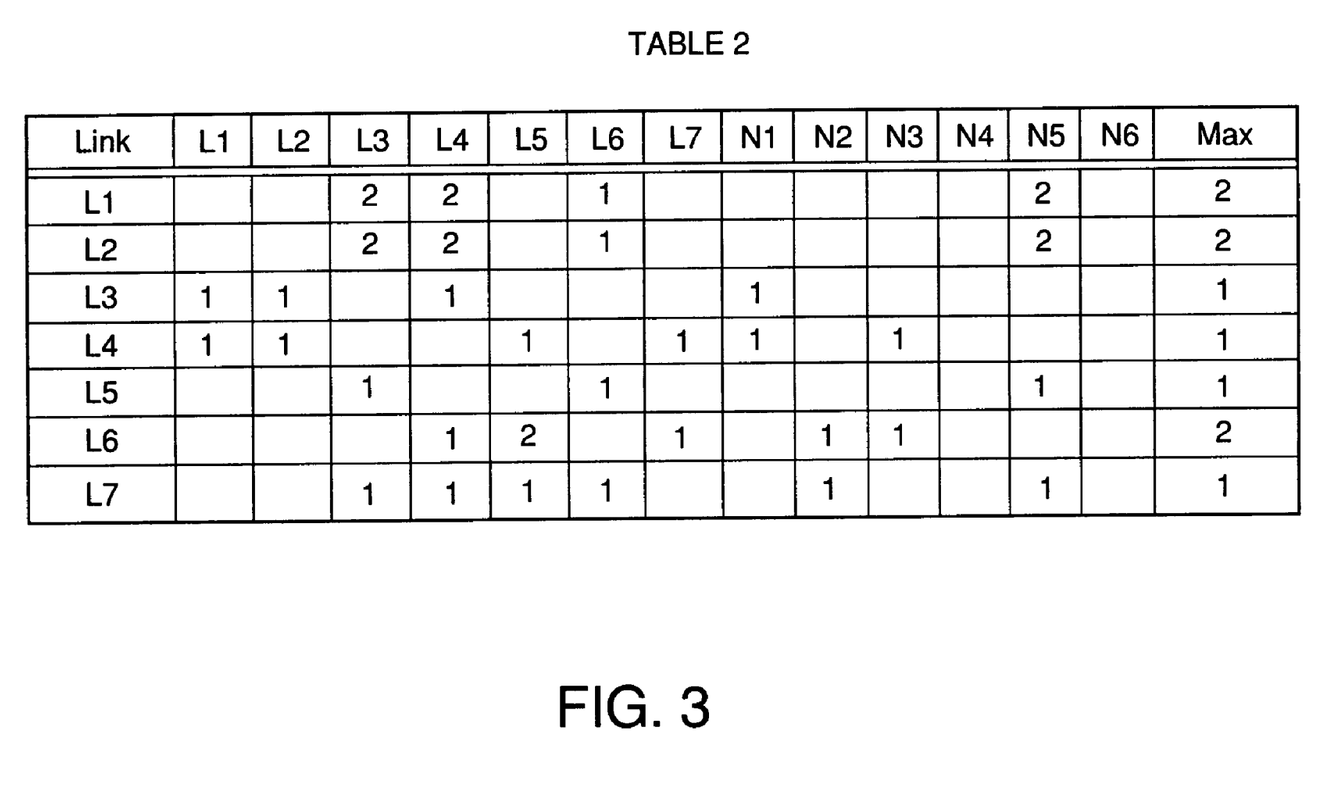
FIG. 3 illustrates TABLE 2, which captures an example of the minimal amount of protection capacity on each link for every possible single link or node failure in the SMDN 100 of FIG. 1 after a new LSP, LSP-11 is added.

As an example, consider arrival of a request for the shared mesh protection service between nodes N4 and N2 of SMDN 100. Assume that at the arrival of the request, the network was in a state captured by FIG. 1 and TABLE 1 of FIG. 2. Further, assume that (N4-L3-N5-L4-N2) (herein LSP-11) and (N4-L1-N1-L2-N2) (herein LSP-12) are the computed primary and protection LSPs, respectively, determined to service this request. As before, signaling along the primary path is used to establish or provision the primary LSP. Also, as before, signaling along the protection path is used to carry the route information as well as the bandwidth demand (assumed in this example to be one unit) of this new demand to all the nodes (i.e., N4, N1, and N2) in the protection path (LSP-12) of the new LSP (LSP-11). As a result, links L1 and L2 of TABLE 1 will be updated (centrally or, in the case of a distributed architecture, at nodes N4, N1, and N2). The update result is captured in TABLE 2 of FIG. 3. Note that an additional one unit of bandwidth is now needed on both links L1 and L2 to guarantee the recovery of the new connection request (LSP-11) from a failure along its working route (i.e., N4-L3-N5-L4-N2).

Note that the availability of the complete sharing information of TABLE 1 at each node allows for more efficient computation of primary and protection paths; however, this is not a requirement for achieving sharing. In the case of a centralized architecture, this capability comes for free as TABLE 1 resides on a centralized server and is available to each node through the centralized command signaling structure (e.g., SNMP). In the case of a distributed architecture, similar capability can be achieved at the cost of periodically exchanging the information of TABLE 1 between nodes. Thus, a centralized approach provides savings in terms of this inter-nodal exchange of information, while a distributed approach provides additional robustness (e.g., the elimination of a single point of failure) and scalability.

Reservation of the Protection Capacity Pool

The protection capacity reserved on a given link is also known as a capacity pool because it may be shared among multiple LSPs for protection purposes. In the embodiment of SMDN 100 of FIG. 1, this pool may be either statically provisioned or dynamically assigned. In both cases, an MPLS switch located at each node in the SMDN is capable of setting aside capacity on each of its connected links without actually allocating it to any LSPs. In practice, each protection LSP is set up with zero or some minimum bandwidth to support operation, administration, and maintenance (OAM) packets associated with the protection signaling of the network. This bandwidth is typically smaller than the bandwidth reserved to protect the working LSP traffic.

In case of static provisioning, a pool of bandwidth on each link is set aside in advance of service provisioning specifically for the purpose of recovering traffic affected by a failure. If the amount of protection bandwidth is known in advance, then static allocation becomes an option. For example, in the case where the SMDN to be protected has a ring topology, half of the available network bandwidth might be statically allocated in advance as the protection bandwidth. Independent of what combination of services of different bandwidths get added to the working half of the bandwidth, the protection half of the bandwidth should be sufficient to protect all working traffic affected by a single link or node failure in the network. By using static allocation, in applying the shared mesh protection methodology of the present invention, bookkeeping is minimized. The call admission control (i.e., the process that accepts a new call or data communication request into the network) for the working traffic (LSP) typically will only admit those calls that will be sufficiently protected by the available bandwidth along the protection path (given at most a single failure in the network).

In the case of dynamic assignment, the size of the protection pool (i.e., the protection bandwidth reserved on each link of the network) may dynamically expand or shrink based on the protection needs of the network as new connections (LSPs) are being admitted or established, and existing connections (LSPs) are being removed, respectively. Thus, dynamic assignment provides flexibility to adapt the protection to changes in the traffic. In a distributed implementation of the shared mesh data network, when sharing information is distributed across the nodes in the network, each node along a new protection path computes the amount of additional protection bandwidth it might need on its downstream connected link along the new protection path to protect a corresponding new primary LSP. For additional protection bandwidth, a node first checks for the availability of the additional bandwidth on the connected link, and if the additional bandwidth is available, the node adds the additional bandwidth to the reserve protection pool of the connected link that is downstream of the node along the protection path.

In case of the centralized server approach, a centralized server computes the additional protection bandwidth needed on each link along the protection path to admit a new connection (LSP). This information is then conveyed as part of the network signaling to establish the protection LSP.

Fast Failure Detection and Notification

As in other asynchronous transport networks, an SMDN according to the present invention that incorporates MPLS for traffic engineering might suffer from uncertainty and potentially unbounded delay in the delivery of packets. This sometimes makes it more difficult to achieve fast failure detection and notification. This is because a failure might not be detected by monitoring just the absence of packet arrivals at a destination. Specifically, there may be ambiguity in distinguishing between the absence of packets due to a failure of an LSP and the absence of traffic on the LSP due to a lull in communication between the source and destination. Therefore, to achieve fast failure detection, in certain implementations of the SMDN of this invention that utilize MPLS for traffic engineering, any of four alternative approaches might be used.

In the first approach, failure detection relies on the physical transport (optical layer) to detect and propagate failure indications up into the MPLS layer. In this approach, every node in the network is assumed to be capable of propagating failure indications downstream by inserting forward-defect-indicator operations-and-maintenance (FDI-OAM) packets into the flow of traffic. More details on OAM and FDI-OAM in MPLS networks can be found in ITU-T Recommendation Y.1711, "OAM mechanism for MPLS networks," November 2002 (herein Y.1711), incorporated herein by reference in its entirety. In this approach, as soon as a node that is downstream from a physical-layer failure detects the failure, it inserts FDI-OAM packets carrying the failure indication in all affected LSPs passing through it. Note that these FDI-OAM packets are inserted in-band in the downstream direction. The destination node of each of the affected primary paths will ultimately receive these special OAM packets. Upon receiving this in-band failure notification, the destination passes the failure information to the source of the affected LSP using backward-defect-indicator OAM (BDI-OAM) packets (also defined in Y.1711). Note that a failure indication from the destination to source is passed using a pre-established LSP disjoint from the failed primary LSP.

Using this first approach, the SMDN can recover quickly (e.g., on the order of tens of milliseconds) from failures that are detectable at the optical layer. However, there maybe other failures above the optical layer that can cause failure of LSPs. Since these failures might not be detectable at the optical layer, optical-layer detection alone might not provide full coverage for failure monitoring of MPLS paths (LSPs).

In a second alternative approach, failure detection and protection at the LSP level can be achieved by periodically inserting special OAM packets, known as fast failure detection (FFD) packets, into the primary LSPs of the SMDN. When a working LSP is provisioned, the source node of the LSP is configured to generate and insert FFD-OAM packets periodically into the LSP with a time interval T. At the receiver side, the arrival of FFD-OAM packets is continuously monitored. The receiver registers a failure on the LSP when it does not see any FFD-OAM packets on the LSP for an interval of n×T, where n is a configurable integer value (n≧1). Note that a larger value of n reduces false failure detection probability. False failure detection occurs when packet delays or loss of FFD-OAM packets (rather than a true connection failure) result in incorrect declaration of an LSP failure. This problem can be addressed within the packet quality-of-service (QoS) framework. For example, one can mark the label of these packets in such a way that these packets are treated with high priority in scheduling and buffer management at each label-switched router (LSR) within each node of the LSP. Consequently delay jitters and dropping of FFD-OAM packets are minimized. QoS prioritization can also be applied to FDI-OAM and BDI-OAM packets to improve performance in the first approach, which was based on failure indication from the optical-transport layer.

In a third approach, the source node of an LSP inserts FFD-OAM packets when the LSP is idle. Specifically, when the LSP is idle for more than a specified time interval, say T, a FFD-OAM packet is inserted and sent to the destination node. The destination node will declare a failure of the LSP when the LSP is in the idle state for an interval greater than n×T where n and T are provisionable parameters of the network. The value of n should be selected such that false failure detection probability is minimized.

Finally, in a fourth and preferred alternative approach, a combination of both optical-layer detection and higher-level MPLS-layer detection (approaches 2 and 3) mechanisms are used when available to achieve a combination of fast and comprehensive failure coverage and recovery.

Assigning Reserve Capacity to Protection LSPs

It is assumed that every protection LSP is established with an assigned bandwidth of zero or some minimal value sufficient to carry OAM traffic. After a failure, traffic coming into the ingress node for a primary LSP is switched to its corresponding protection LSP, and traffic exiting the egress node for the primary LSP is selected from the protection LSP instead of from the primary LSP. The aggregate bandwidth for the protected traffic on primary LSPs is reserved in advance as part of the protection pool in the SMDN. Note that the bandwidth of the protection pool is not reassigned to any protection LSP. After the failure, each protection LSP that is providing protection against a specific failure needs to be assigned the same bandwidth and QoS characteristics as were assigned to the primary LSP it protects. This requires changing the bandwidth assignment of each of these protection LSPs. This can be accomplished through RSVP-TE using its bandwidth change procedure (see RFC 3209 for details).

Switching Between Working and Protection LSPs

As discussed above, after detecting a failure, end nodes of an LSP switch traffic from a primary (i.e., working) LSP to its corresponding protection LSP. Note that both working and protection LSPs typically enter the ingress node and exit the egress node using different ports.

At the ingress node, this may be accomplished by the node maintaining two different next-hop label-forwarding entry (NHLFE) entries in the MPLS forwarding equivalence class-to-NHLFE (FEC-to-NHLFE) (FTN) map (one for the working path and the other for protection path) and activating only one of these at a time. Since the FTN is used to map incoming client packets to a NHLFE, activating one or the other of these entries will serve to direct packets coming into an ingress node to the working or the protection path, effectively switching between working and protection LSPs. Thus, protection switching on ingress involves switching from the working to the protection NHLFE. On the egress node, there is a separate NHLFE entry for working and protection LSPs dictating the next action. Based on the label (for a switch-wide label-space implementation) or combination of port and label (for a port-based label-space implementation) that the packet carries, the proper entry is chosen and correspondingly the next action/operation (e.g., pop the label and pass the payload to the client layer) (see RFC 3031) dictated by the entry for the packetThus, no specific switching really needs to be performed at the egress node since the action has the effect of delivering the data from the proper path (e.g., primary or protection) to the client. Note that both entries normally dictate the same next action.

Functional Architecture

The SMDN of the present invention can be partitioned into a variety of modules. These modules are part of a network manager that may be implemented at a centralized server or distributed partially or fully to the nodes. Some exemplary modules, representing one specific functional partitioning of components of the SMDN of the present invention, which provide functionality such as fault detection and notification, protection switching, signaling and control, routing, and OAM, are listed below:

Service Agent (SA): This module provides interface to application or service management for provisioning paths with different restoration/QoS requirements.

Path Management (PM): This module primarily consists of the signaling protocol such as RSVP-TE. It is responsible for path setup, refresh, tear down, and monitoring functions.

Path Computation (PC): This module provides path computation services to the path management module. It interfaces with the link-state-based routing protocol (NT) to obtain the network topology.

Network Topology (NT): This module primarily consists of the link-state-based routing protocol. It is responsible for monitoring and updating of network topology.

Fault Detection (FD): This module provides the fault detection capability. Faults can be detected through monitoring of layer-1, layer-2, and layer-3.

Fault Notification (FN): This module is responsible for notifying protection switching nodes of detected faults.

Protection Switching (PS): This module is responsible for switching the affected traffic onto a protection LSP after detecting a failure or receiving failure notification.

OAM&P (OAM): This module is responsible for providing performance monitoring functions on a per-LSP basis through use of special OAM&P packets. It can help in detecting any faults affecting the MPLS shim-layer.

Bandwidth Sharing Information (BSI): This module is responsible for managing the sharing of information related to protection sharing in the SMDN. It provides functionality at each node to keep track of the sharing status at each of the incident links to that node. This module works in conjunction with the PM module, which uses special signaling to carry working path information (bandwidth, nodes, and links) along the protection path in the SMDN. This information is required to keep bandwidth sharing information current.

These functional modules can be classified into two groups. The first group includes those functional modules that support a manually provisioned shared mesh protection service. This set includes FD, FN, PS, and OAM modules. The second group includes modules that bring automation to resource discovery, path computation, and path establishment and management. These modules can perform signaling and control plane functions. They include SA, PM, PC, and NT.

Figure 4:
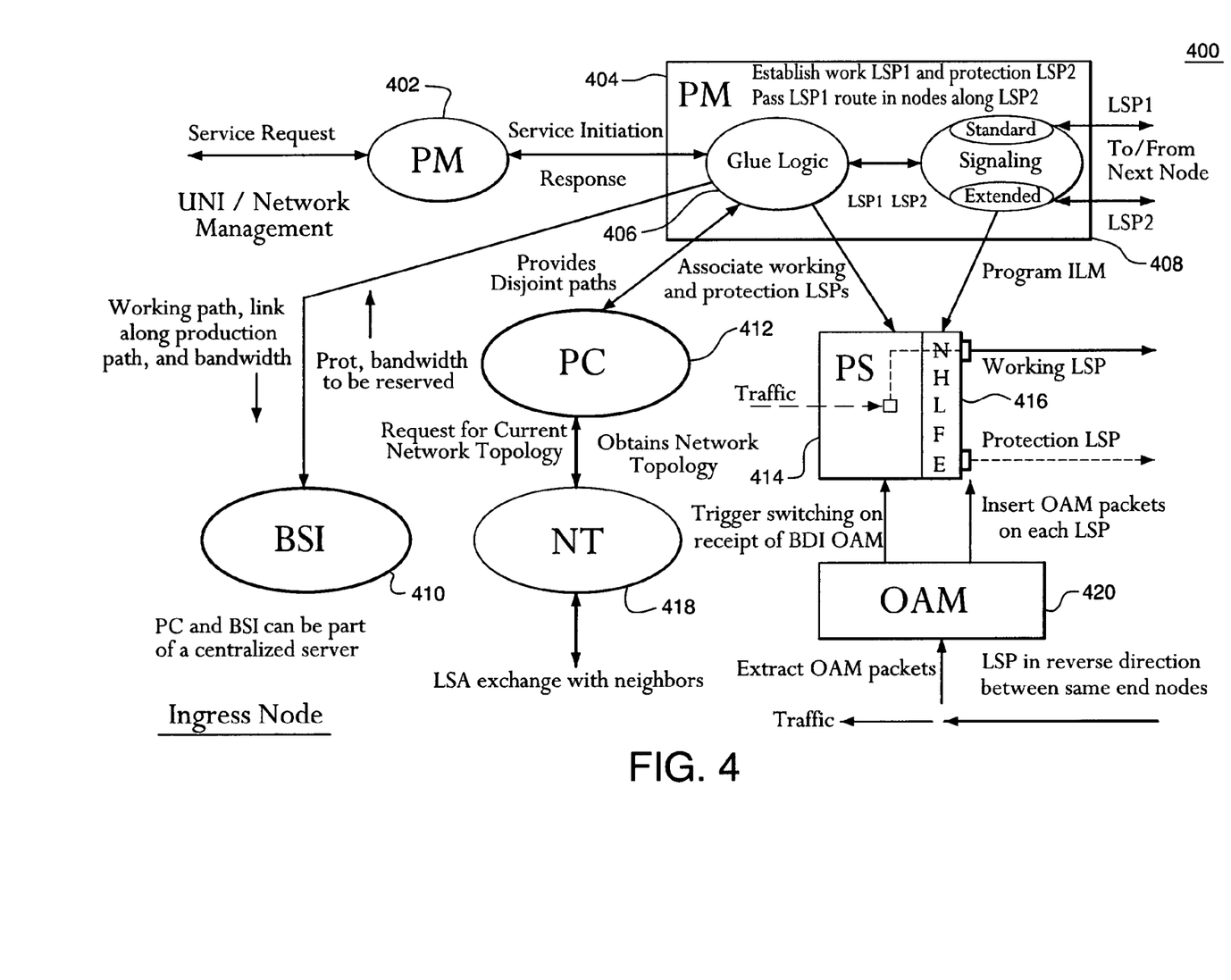
FIG. 4 illustrates exemplary modules, representing one specific functional partitioning of components of an ingress node of SMDN 100 of FIG. 1.
Figure 5:
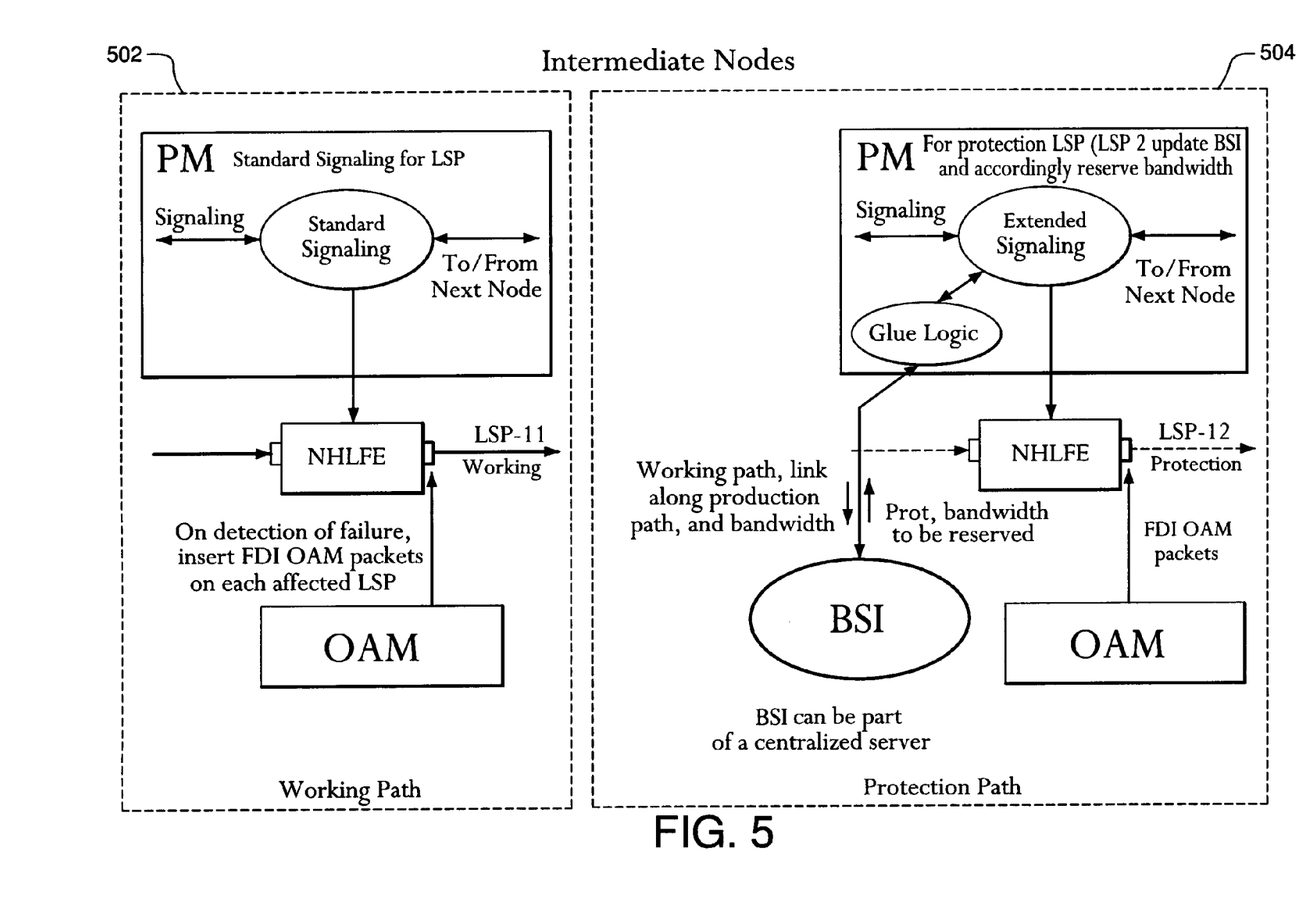
FIG. 5 illustrated exemplary modules included in intermediate nodes along the working path and protection path, respectively of SMDN 100 of FIG. 1.
Figure 6:
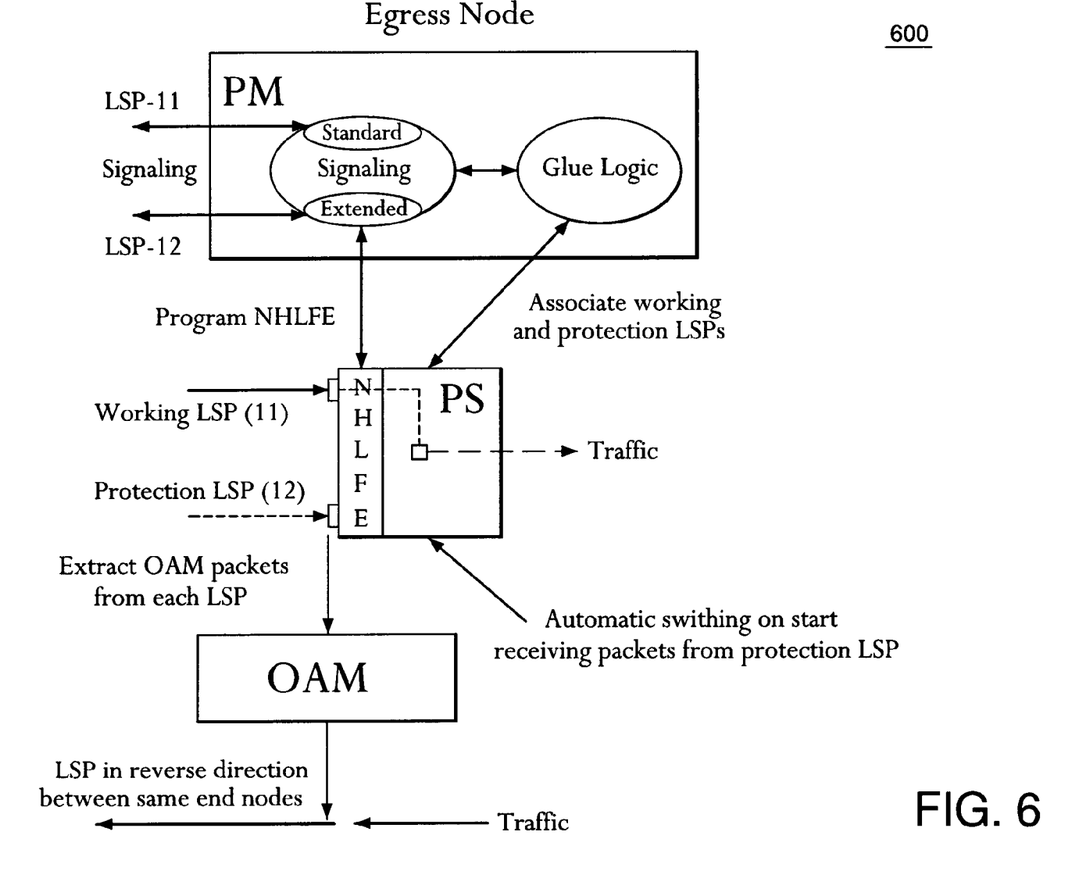
FIG. 6 illustrates exemplary modules, representing one specific functional partitioning of components of an egress node of SMDN 100 of FIG. 1.

FIGS. 4, 5, and 6 illustrate the functionality of the ingress, intermediate, and egress nodes, respectively, of the SMDN. These figures collectively illustrate a distributed implementation of the path computation function of SMDN 100 of FIG. 1. In contrast to the illustrated implementation, in a centralized implementation, path computation and sharing information functions would reside on a centralized server.

Ingress, Intermediate, and Egress Nodes

FIGS. 4, 5, and 6 depict the interrelationship of the subset of modules that comprise ingress, intermediate, and egress node operations of the nodes within an SMDN according to one embodiment of the present invention. Note that, typically, any node within an SMDN may at one time or another, for one service or another, serve as an ingress node, an intermediate node, or an egress node, or simultaneously as two or more of ingress, intermediate, or egress nodes. Therefore, FIGS. 4, 5, and 6 do not necessarily depict unique nodes in the SMDN, but rather highlight the relevant functions of a node that are associated with its operation as ingress, intermediate, or egress with respect to a particular LSP.

The function of each of the modules was described in the previous section. To complement those descriptions, the role of each of the modules in each of these nodes is described herein with respect to the exemplary establishment of a new service. For clarity, this example will parallel the example provided earlier of the addition of LSP-11 (working) and LSP-12 (protection) to the SMDN of FIG. 1.

To begin, a service request is received at node N4 of FIG. 1 for the establishment of an LSP between N4 and N2 of SMDN 100. Assume that, at the arrival of the request, the network was in a state captured by FIG. 1 and TABLE 1 of FIG. 2. Referring to FIG. 4, the service request is received and serviced by service agent (SA) 402 of ingress node 400 via either user network interface (UNI) or simple network management protocol (SNMP) signaling. Details on SNMP and ATM UNI can be found in RFC2570 and The ATM Forum, "ATM User Network Interface (UNI) version 4.1," November 2002 (herein "UNI4.1"), each incorporated herein by reference in its entirety. The SA provides a translation between the application-layer request for the service and path management (PM) function 404, which is responsible for the establishment and monitoring of the health of the LSP and its protection path. As illustrated, the PM includes glue logic 406 and standard and extended signaling components 408. Glue logic 406 allows the PM to interface with various other modules within the node that it needs to communicate with to accomplish its task, while signaling submodule 408 allows the PM to communicate information about the new paths to other nodes in the SMDN.

Specifically, glue logic 406 allows the PM to communicate with path computation (PC) module 412 to determine two suitable disjoint (if possible) paths for working and protection LSPs. The PC in turn interfaces to network topology (NT) module 418 to gather current topology information (e.g., via link-state architecture (LSA) messages) used in the path computation. In this example, it can be assumed that PC 412 returned the disjoint paths (N4-L3-N5-L4-N2) and (N4-L1-N1-L2-N2) to PM (possibly among other disjoint pairs) to consider as working and protection paths for the newly requested service.

Glue logic 406 also allows the PM to communicate with bandwidth sharing information (BSI) module 410. The BSI module is responsible for managing the sharing of information related to protection in the SMDN associated with LPS-11 and LSP-12. Its function in N4 is to keep track of the sharing status at each of the incident links to N4 (namely L1 and L3). Thus, it does the bookkeeping for sharing for N4 and thus maintains the information corresponding to rows L1 and L3 of TABLE 1 (and, after update, TABLE 2). The BSI is also responsible for providing the PM with working-path information that it needs to share (along the protection path of the new LSP) to keep the network up-to-date with the sharing information.

The PM also interfaces via glue logic 406 to protection switching (PS) module 414 to indicate by which path (working or protection) incoming traffic will exit N4. As discussed before, this may be implemented by activating one or another of the two NHLFE in the (FTN) map (represented here by PS submodule NHLFE 416). During the creation of a service, the traffic is mapped to the NHLFE corresponding to the working LSP. The entry selection decision (and consequently the choice of working or protection path) may be overridden by information (e.g., via BDI-OAM packets) received via OAM module 420 indicating a failure somewhere along the downstream working path, in which case the traffic mapping is switched to the other NHLFE entry corresponding to the protection LSP. Note that this switching of traffic between working and protection can also be forced via a network management command. OAM 420 also functions to insert OAM packets (e.g., FFD-OAM and FDI-OAM) into the working and protection paths to support monitoring and failure detections in the SMDN.

Referring next to FIG. 5, 502 and 504 depict the functional modules active in an intermediate node along the working path and the protection path, respectively, of the SMDN. With respect to our example, 502 depicts the operation of a node (e.g., N5) that is along working path LSP-11, and 504 depicts the operation of a node (e.g., N1) that is along protection path LSP-12.

As illustrated by 502, the PM in a working path intermediate node relays standard signaling along the path and directs incoming label-switched traffic to the next hop along the working path as indicated by the active entry (NHLFE) in the local ILM. If necessary (i.e., if a failure is detected), the local OAM function may insert FDI-OAM packets into relevant LSPs to support monitoring and failure detection in the SMDN.

As illustrated by 504, the PM in a protection path intermediate node performs similarly to the PM in the working path intermediate node but has some additional active modules as well. Namely, extended signaling functions within the PM allow for the receipt of sharing information about the working path to be communicated via the glue logic to the local BSI module. As in the ingress node, the BSI will maintain and update sharing information associated with incident links to its node. For example, if 504 represents the active modules in intermediate node N1 along LSP-12, then it will store the sharing information corresponding to its incident links L1 and L2, namely rows L1 and L2 of TABLE 1 (and, after the establishment of the new LSP, rows L1 and L2 of TABLE 2).

Finally, in an egress node (illustrated by exemplary node 600 of FIG. 6), the PM serves as a terminal point in the LSP signaling chain for both standard and extended signaling. It also interfaces to the PS to configure the two NHLFE entries corresponding to working and protection LSPs. The incoming label selects the NHLFE entry that, as discussed before, dictates the next action on the packet. In this case, NHLFE traffic is extracted (corresponding to which path is actively carrying traffic) and passed on to the node-attached client packet. In the case of penultimate hop popping, there may not be an NHLFE at the egress node. In this case, the previous node pops the label and the next operation is implicitly derived from the packet itself (for example, Internet protocol (IP) will be used to route the IP packet). An OAM module in the egress node extracts OAM packets from each LSP and inserts them in the corresponding LSPs in the reverse direction to support monitoring and failure detection and recovery in the SMDN.

While the embodiments of this invention have been discussed with respect to protection, they may equally well be applied to restoration, with the assumption that some or all of the calculations associated with paths are calculated after the detection of a failure.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A mesh data network comprising:

two or more nodes;

two or more links interconnecting the nodes; and a network manager adapted to control reservation of protection bandwidth for the links, wherein:

a first link in the network is part of two or more protection paths, each protection path corresponding to a different primary path;

the network manager is adapted to determine how much protection bandwidth to reserve on the first link for the two or more protection paths, wherein the protection bandwidth reserved on the first link is shared between the protection paths of the two or more primary paths, such that the amount of protection bandwidth reserved on the first link is less than the sum of the bandwidths of the two or more primary paths;

a source node of a primary path is adapted to generate and insert failure detection (FD) packets into the primary path;

a destination node of the primary path is adapted to monitor the arrival of FD packets;

the destination node is adapted to register a failure on the primary path when no FD packets arrive during a specified interval of time; and one or more of the FD packets are marked in such a way that the marked packets are treated with relatively high priority in one or more of scheduling and buffer management at one or more of the nodes along the primary path.

2. The mesh data network of claim 1, wherein:

two or more of the primary paths are at least partially disjoint;

the network manager is implemented at a centralized server;

the network is a multiprotocol label switching (MPLS) optical network; and the amount of protection bandwidth reserved on the first link is at least the maximum of the bandwidths of the two or more primary paths.

3. The mesh data network of claim 2, wherein the two or more primary paths are strictly disjoint.

4. The mesh data network of claim 1, wherein:

the network manager is adapted to detect failures at a physical layer in the network; and nodes in the network are adapted to insert and propagate defect indicator packets into and along paths in the network.

5. The mesh data network of claim 1, wherein the FD packets are inserted into the primary path with a period T, and the specified interval is of length n×T, where n and T are provisionable parameters.

6. The mesh data network of claim 1, wherein:

an FD packet is inserted into the primary path when the primary path has been idle for a duration T;

the destination node is adapted to determine when the primary path is idle; and the specified interval of time is of length n×T, where n and T are provisionable parameters.

7. The mesh data network of claim 1, wherein the destination node is adapted to pass failure information to the source node of the primary path, upon detecting a failure on the primary path, by inserting backward-defect-indicator (BDI) packets into a path that is at least partially disjoint from the primary path.

8. The mesh data network of claim 1, wherein:
the network manager is adapted to detect failures at a physical layer in the network; and
nodes in the network are adapted to insert and propagate defect indicator packets into and along paths in the network.

9. The mesh data network of claim 1, wherein the network manager is adapted to allocate the bandwidth that was reserved for the first link upon receiving notification of the failure.

10. The mesh data network of claim 1, further comprising:
a database that includes a storage location SL-1 corresponding to a link L-1; and
a function executed by the network manager that has knowledge of a potential failure element E-1 of the network, where the element E-1 is one of a node or link within the network, wherein:
the function is adapted to calculate a first sum of the bandwidths of the primary paths that traverse the element E-1 whose protection paths traverse the link L-1; and
the function is adapted to store the first sum in the storage location SL-1.

11. The mesh data network of claim 10, wherein the function executed by the network manager further has knowledge of a second potential failure element E-2 of the network, where the element E-2 is one of a node or link within the network that is different from the element E-1, wherein:
the function is adapted to calculate a second sum of the bandwidths of the primary paths that traverse the element E-2 whose protection paths traverse the link L-1; and
the function is adapted to compare the second sum with the first sum and calculate the greater of the first sum and the second sum.

12. A computer-implemented method for protecting a mesh data network, comprising:
the computer determining a first link that is traversed by two or more protection paths;
the computer determining bandwidth of a primary path that corresponds to each of the two or more protection paths; and
the computer reserving on the first link an amount of protection bandwidth, wherein the protection bandwidth reserved on the first link is shared between the protection paths of the two or more primary paths, such that the amount of protection bandwidth reserved on the first link is less than the sum of the bandwidths of the two or more primary paths, wherein:
a source node of a primary path generates and inserts failure detection (FD) packets into the primary path;
a destination node of the primary path monitors the arrival of FD packets;
the destination node registers a failure on the primary path when no FD packets arrive during a specified interval of time; and
one or more of the FD packets are marked in such a way that the marked packets are treated with relatively high priority in one or more of scheduling and buffer management at one or more of the nodes along the primary path.

13. The computer-implemented method of claim 12, wherein:
two or more of the primary paths are at least partially disjoint;
the method is implemented at a centralized server;
the network is a multiprotocol label switching (MPLS) optical network; and
the amount of protection bandwidth reserved on the first link is at least the maximum of the bandwidths of the two or more primary paths.

14. The computer-implemented method of claim 13, wherein the two or more primary paths are strictly disjoint.

15. The computer-implemented method of claim 12, wherein:
the computer detects failures at a physical layer in the network; and
nodes in the network are adapted to insert and propagate defect indicator packets into and along paths in the network.

16. The computer-implemented method of claim 12, wherein the FD packets are inserted into the primary path with a period T, and the specified interval is of length n×T, where n and T are provisionable parameters.

17. The computer-implemented method of claim 12, wherein:
an FD packet is inserted into the primary path when the primary path has been idle for a duration T;
the destination node determines when the primary path is idle; and
the specified interval of time is of length n×T, where n and T are provisionable parameters.

18. The computer-implemented method of claim 12, wherein, upon detecting a failure on the primary path, the destination node passes failure information to the source node of the primary path by inserting backward-defect-indicator (BDI) packets into a path that is at least partially disjoint from the primary path.

19. The computer-implemented method of claim 12, wherein:
the computer detects failures at a physical layer in the network; and
nodes in the network are adapted to insert and propagate defect indicator packets into and along paths in the network.

20. The computer-implemented method of claim 12, wherein the computer allocates the bandwidth that was reserved on the first link upon detection of the failure.

21. The computer-implemented method of claim 12, wherein:
the computer utilizes a database that includes a storage location SL-1 corresponding to a link L-1; and
the computer has knowledge of a potential failure element E-1 of the network, where the element E-1 is one of a node or link within the network, wherein:
the computer calculates a first sum of the bandwidths of the primary paths that traverse the element E-1 whose protection paths traverse the link L-1; and
the computer stores the first sum in the storage location SL-1.

22. The computer-implemented method of claim 21, wherein the computer further has knowledge of a second potential failure element E-2 of the network, where the element E-2 is one of a node or link within the network that is different from the element E-1, wherein:
the computer calculates a second sum of the bandwidths of the primary paths that traverse the element E-2 whose protection paths traverse the link L-1; and the computer compares the second sum with the first sum and calculates the greater of the first sum and the second sum.

23. An apparatus for protecting a mesh data network, comprising:
means for determining a first link that is traversed by two or more protection paths;
means for determining bandwidth of a primary path that corresponds to each of the two or more protection paths; and
means for reserving on the first link an amount of protection bandwidth, wherein the protection bandwidth reserved on the first link is shared between the protection paths of the two or more primary paths, such that the amount of protection bandwidth reserved on the first link is less than the sum of the bandwidths of the two or more primary paths wherein:
a source node of a primary path generates and inserts failure detection (FD) packets into the primary path;
a destination node of the primary path monitors the arrival of FD packets;
the destination node registers a failure on the primary path when no FD packets arrive during a specified interval of time; and
one or more of the FD packets are marked in such a way that the marked packets are treated with relatively high priority in one or more of scheduling and buffer management at one or more of the nodes along the primary path.

24. A controller for a mesh data network comprising two or more nodes and two or more links interconnecting the nodes, wherein:
the controller is adapted to control reservation of protection bandwidth for the links;
a first link in the network is part of two or more protection paths, each protection path corresponding to a different primary path;
the controller is adapted to determine how much protection bandwidth to reserve on the first link for the two or more protection paths, wherein the protection bandwidth reserved on the first link is shared between the protection paths of the two or more primary paths, such that the amount of protection bandwidth reserved on the first link is less than the sum of the bandwidths of the two or more primary paths;
a source node of a primary path is adapted to generate and insert failure detection (FD) packets into the primary path;
a destination node of the primary path is adapted to monitor the arrival of FD packets;
the destination node is adapted to register a failure on the primary path when no FD packets arrive during a specified interval of time; and
one or more of the FD packets are marked in such a way that the marked packets are treated with relatively high priority in one or more of scheduling and buffer management at one or more of the nodes along the primary path.

25. The mesh data network of claim 1, wherein the first link further comprises bandwidth assigned to one or more protected primary paths.

26. The computer-implemented method of claim 12, wherein the first link further comprises bandwidth assigned to one or more protected primary paths.

27. A mesh data network comprising:
two or more nodes;
two or more links interconnecting the nodes; and
a network manager adapted to control reservation of protection bandwidth for the links, wherein:
a first link in the network is part of two or more protection paths, each protection path corresponding to a different primary path;
the network manager is adapted to determine how much protection bandwidth to reserve on the first link for the two or more protection paths, wherein the protection bandwidth reserved on the first link is shared between the protection paths of the two or more primary paths, such that the amount of protection bandwidth reserved on the first link is less than the sum of the bandwidths of the two or more primary paths;
a source node of a primary path is adapted to generate and insert failure detection (FD) packets into the primary path;
a destination node of the primary path is adapted to monitor the arrival of FD packets;
the destination node is adapted to register a failure on the primary path when no FD packets arrive during a specified interval of time; and
the FD packets are inserted into the primary path with a period T, and the specified interval is of length n×T, where n and T are provisionable parameters.

28. A mesh data network comprising:
two or more nodes;
two or more links interconnecting the nodes; and
a network manager adapted to control reservation of protection bandwidth for the links, wherein:
a first link in the network is part of two or more protection paths, each protection path corresponding to a different primary path;
the network manager is adapted to determine how much protection bandwidth to reserve on the first link for the two or more protection paths, wherein the protection bandwidth reserved on the first link is shared between the protection paths of the two or more primary paths, such that the amount of protection bandwidth reserved on the first link is less than the sum of the bandwidths of the two or more primary paths;
a source node of a primary path is adapted to generate and insert failure detection (FD) packets into the primary path;
a destination node of the primary path is adapted to monitor the arrival of FD packets;
the destination node is adapted to register a failure on the primary path when no FD packets arrive during a specified interval of time;
an FD packet is inserted into the primary path when the primary path has been idle for a duration T;
the destination node is adapted to determine when the primary path is idle; and
the specified interval of time is of length n×T, where n and T are provisionable parameters.

29. A mesh data network comprising:
two or more nodes;
two or more links interconnecting the nodes;
a network manager adapted to control reservation of protection bandwidth for the links, wherein:
a first link in the network is part of two or more protection paths, each protection path corresponding to a different primary path; and
the network manager is adapted to determines how much protection bandwidth to reserve on the first link for the two or more protection paths, wherein the protection bandwidth reserved on the first link is shared between the protection paths of the two or more primary paths, such that the amount of protection bandwidth reserved on the first link is less than the sum of the bandwidths of the two or more primary paths;
a database that includes a storage location SL-1 corresponding to a link L-1;
a function executed by the network manager that has knowledge of a potential failure element E-1 of the network, where the element E-1 is one of a node or link within the network, wherein:
the function is adapted to calculates a first sum of the bandwidths of the primary paths that traverse the element E-1 whose protection paths traverse the link L-1; and
the function is adapted to stores the first sum in the storage location SL-1; and
the function executed by the network manager further has knowledge of a second potential failure element E-2 of the network, where the element E-2 is one of a node or link within the network that is different from the element E-1, wherein:
the function is adapted to calculate a second sum of the bandwidths of the primary paths that traverse the element E-2 whose protection paths traverse the link L-1; and
the function is adapted to compare the second sum with the first sum and calculates the greater of the first sum and the second sum.

30. A computer-implemented method for protecting a mesh data network, comprising:
the computer determining a first link that is traversed by two or more protection paths;
the computer determining bandwidth of a primary path that corresponds to each of the two or more protection paths;
the computer reserving on the first link an amount of protection bandwidth, wherein the protection bandwidth reserved on the first link is shared between the protection paths of the two or more primary paths, such that the amount of protection bandwidth reserved on the first link is less than the sum of the bandwidths of the two or more primary paths;
the computer utilizing a database that includes a storage location SL-1 corresponding to a link L-1, wherein the computer has knowledge of a potential failure element E-1 of the network, where the element E-1 is one of a node or link within the network;
the computer calculating a first sum of the bandwidths of the primary paths that traverse the element E-1 whose protection paths traverse the link L-1; and
the computer storing the first sum in the storage location SL-1, wherein the computer further has knowledge of a second potential failure element E-2 of the network, where the element E-2 is one of a node or link within the network that is different from the element E-1, wherein:
the computer calculates a second sum of the bandwidths of the primary paths that traverse the element E-2 whose protection paths traverse the link L-1; and
the computer compares the second sum with the first sum and calculates the greater of the first sum and the second sum.

31. The mesh data network of claim 1, wherein:
the network manager is adapted to determine how much protection bandwidth to reserve on the first link for the two or more protection paths, wherein the protection bandwidth reserved on the first link is shared between the protection paths of the two or more primary paths, such that the amount of protection bandwidth reserved on the first link is less than the sum of the bandwidths of the two or more primary paths;
the network manager is adapted to receive notification of a failure of a primary link that is along a primary path, that has a protection path that includes the first link;
the network manager is adapted to send a switching request to a switching node that is along the primary path and upstream of the primary link;
the network manager is adapted to send the switching request to the switching node, when the network manager receives notification of the failure of the primary link; and
the switching node is adapted to switch data that is associated with the primary path away from the primary link and to the protection path that includes the first link, when the switching node receives the switching request.

32. The computer-implemented method of claim 12, further comprising:
detecting a failure of a primary link that is along a primary path;
storing information that includes a protection path for the primary path, the protection path including the first link; and
sending a switching request to a switching node that is along the primary path and upstream of the primary link, wherein:
when the computer detects the failure of the primary link, the computer sends the switching request to the switching node; and
when the switching node receives the switching request, the switching node switches data that is associated with the primary path away from the primary link and to the protection path that includes the first link.

33. The apparatus of claim 23, further comprising:
means for detecting a failure of a primary link that is along a primary path;
means for storing information that includes a protection path for the primary path, the protection path including the first link; and
means for sending a switching request to a switching node that is along the primary path and upstream of the primary link, wherein:
when the detecting means detects the failure of the primary link, the sending means sends the switching request to the switching node; and
when the switching node receives the switching request, the switching node switches data that is associated with the primary path away from the primary link and to the protection path that includes the first link.

34. The controller of claim 24, wherein:
the controller is adapted to receive notification of a failure of a primary link that is along a primary path, that has a protection path that includes the first link; and
the controller is adapted to send a switching request to a switching node that is along the primary path and upstream of the primary link, wherein:
the controller is adapted to send the switching request to the switching node, when the controller receives notification of the failure of the primary link; and
the switching node is adapted to switch data that is associated with the primary path away from the primary link and to the protection path that includes the first link, when the switching node receives the switching request.

* * * * *

UNITED STATES PATENT AND TRADEMARK OFFICE
CERTIFICATE OF CORRECTION

PATENT NO.       : 7,606,237 B2                                                    Page 1 of 1
APPLICATION NO. : 10/639728
DATED            : October 20, 2009
INVENTOR(S)      : Dziong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1573 days.

Signed and Sealed this

Fourteenth Day of December, 2010

David J. Kappos
*Director of the United States Patent and Trademark Office*